United States Patent [19]

Choe

[11] Patent Number: 5,045,625

[45] Date of Patent: Sep. 3, 1991

[54] THERMOSETTING POLYIMIDE PREPOLYMERS

[75] Inventor: Eui W. Choe, Randolph, N.J.

[73] Assignee: Hoechst Celanese Corp., Somerville, N.J.

[21] Appl. No.: 476,952

[22] Filed: Feb. 8, 1990

Related U.S. Application Data

[62] Division of Ser. No. 312,273, Feb. 21, 1989.

[51] Int. Cl.$^5$ .................. C08G 8/02; C08G 73/00; C08G 75/00; C08G 69/14
[52] U.S. Cl. .................. 528/170; 528/125; 528/128; 528/171; 528/323
[58] Field of Search ............... 528/171, 170, 125, 128, 528/323

[56] References Cited

U.S. PATENT DOCUMENTS

| | | | |
|---|---|---|---|
| 3,868,351 | 2/1975 | Hand et al. | 528/183 |
| 3,996,203 | 12/1976 | Hand et al. | 528/345 |
| 4,645,803 | 2/1987 | Kohli et al. | 528/99 |

*Primary Examiner*—John Kight
*Assistant Examiner*—P. Hampton Hightower
*Attorney, Agent, or Firm*—James M. Hunter

[57] ABSTRACT

In one embodiment this invention provides novel thermosetting aromatic polyimide prepolymers which have superior solubility and flow properties, and which can be thermally cured to heat and oxidation resistant thermoset adhesives, films, and molded products.

Illustrative of a prepolymer is the dimaleimide of 2,2-bis[p,p'-(m-aminophenoxy)phenylsulfonyl(p-phenyleneoxy)-phenyl]propane.

3 Claims, No Drawings

THERMOSETTING POLYIMIDE PREPOLYMERS

This application is a division of application Ser. No. 312,273, filed Feb. 21, 1989.

CROSS-REFERENCE TO RELATED PATENT APPLICATION

The subject matter of this patent application is related to that disclosed in patent application Ser. No. 192,460, filed May 10, 1988.

BACKGROUND OF THE INVENTION

There is an increasing demand for synthetic materials capable of maintaining their properties at elevated temperatures and under exposure to a wide variety of chemical environments.

Of particular interest are polyimides and polyamide-imides, since these polymers are generally recognized for their outstanding physical and chemical properties.

Polyimides are being marketed as varnishes, coatings for glass fibers, self-supporting films, laminating resins, and molded products such as bearings, piston rings, and the like.

U.S. Pat. Nos. which describe polyimides and polyamide-imides include 3,528,950; 3,658,764; 3,697,345; 3,781,249; 3,842,143; 3,897,395; 3,993,630; 4,035,345; 4,066,621; 4,107,153; 4,168,360; 4,302,575; 4,393,188; 4,395,514; 4,568,733; and references cited therein.

While polyimides are known to have outstanding physical and chemical properties, the problems encountered in preparing and processing polyimide prepolymers and thermoset polymers have limited their full potential.

Polyimide prepolymers in general are not readily soluble in organic solvents. In many instances the polyimide prepolymers have poor flow properties, and typically the polyimide prepolymers have high melting points and high curing temperatures. Also, the thermoset resins derived by curing of the polyimide prepolymers often tend to be brittle and lack good mechanical properties.

There is continuing research effort to develop polyimide type thermosetting prepolymers which have a desirable balance of processing properties, and which can be heat-cured to high strength composites, tough flexible films, and the like, by means of conventional equipment and procedures.

Accordingly, it is an object of this invention to provide novel thermosetting polyimide prepolymers which have desirable processing characteristics such as improved solubility and flow properties.

It is another object of this invention to provide thermosetting polyimide prepolymers which are heat-curable to high performance adhesives, coatings, films and composites with an improved combination of thermooxidative and mechanical properties.

Other objects and advantages of the present invention shall become apparent from the accompanying description and examples.

DESCRIPTION OF THE INVENTION

One or more objects of the present invention are accomplished by the provision of a thermosetting prepolymer corresponding to the formula:

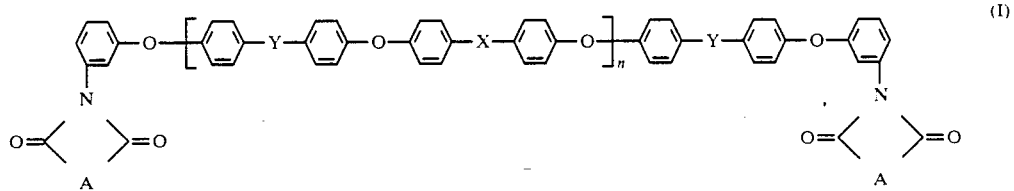

where X is a single bond, or an oxy, thio, carbonyl, sulfonyl radical, or an alkylene, haloalkylene or aralkylene radical containing between about 1-18 carbon atoms; Y is a $C_1$-$C_6$ alkylene, carbonyl or sulfonyl radical; A is a divalent $C_2$-$C_{12}$ organic radical having olefinic unsaturation; and n is a number having an average value between about 1-5.

A present invention thermosetting prepolymer corresponding to the above illustrated formula is prepared by the condensation of anhydride and diamine reactants of the following structures:

where A, X, Y and n are as previously defined.

Suitable monoanhydrides reactants corresponding to the above formula(II) include maleic anhydride; 2,3-dimethylmaleic anhydride; 2,3-dichloromaleic anhydride; citraconic anhydride; itaconic anhydride; and the like; and Diels-Alder reaction products of this type of olefinically unsaturated monoanhydride with an acyclic, alicyclic or heterocyclic diene, as illustrated by anhydride compounds such as 5-norbornene-2,3-dicarboxylic anhydride(nadic anhydride); tetrahydrophthalic anhydride; 3,6-endomethylene-1,2,3,6-tetrahydrophthalic anhydride; bicyclo[2,2,1]hept-5-ene-5,6-dimethyl-2,3-dicarboxylic anhydride; and the like.

The divalent radical X in the above diamine formula(III) is illustrated by groups which include —O—, —S—, —CO—, —SO₂—, —CH₂—, —C(CH₃)₂—, —C(CF₃)₂—,

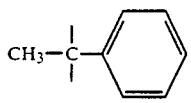

and the like.

The divalent radical Y in the above diamine formula (III) is illustrated by groups which include —CH₂—, —CH₂—CH₂—, —C₆H₁₂—, —CO—, —SO₂—, and the like.

An important feature of an invention diamine of formula(III) is the "meta" ring position of each of the two amine substituents. The excellent flow properties of a present invention polyimide prepolymer of formula(I) above are attributable at least in part to the meta positioning of the two amine substituents. If a diamine reactant has "para" positioning of amine substituents in formula(III), then the polyimide prepolymer derived therefrom has less desirable flow properties and other processing characteristics.

Another important feature of an invention diamine of formula(III) which contributes to the processability of a formula(I) polyimide is the particular number and geometric positioning of the phenoxy oxygen atoms and the X and Y divalent radicals, and the specific selected types of X and Y structures.

POLYIMIDE PREPOLYMER SYNTHESIS

A polyimide prepolymer of the present invention is prepared by the condensation reaction between an anhydride of formula(II) and an aromatic diamine of formula(III).

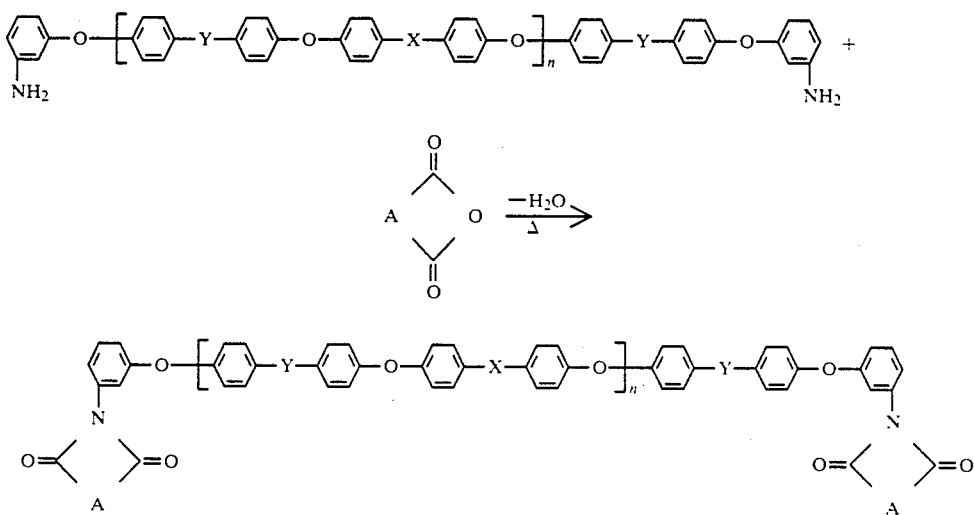

The preparation of a diamine of formula(III) above is illustrated by the following reaction sequence:

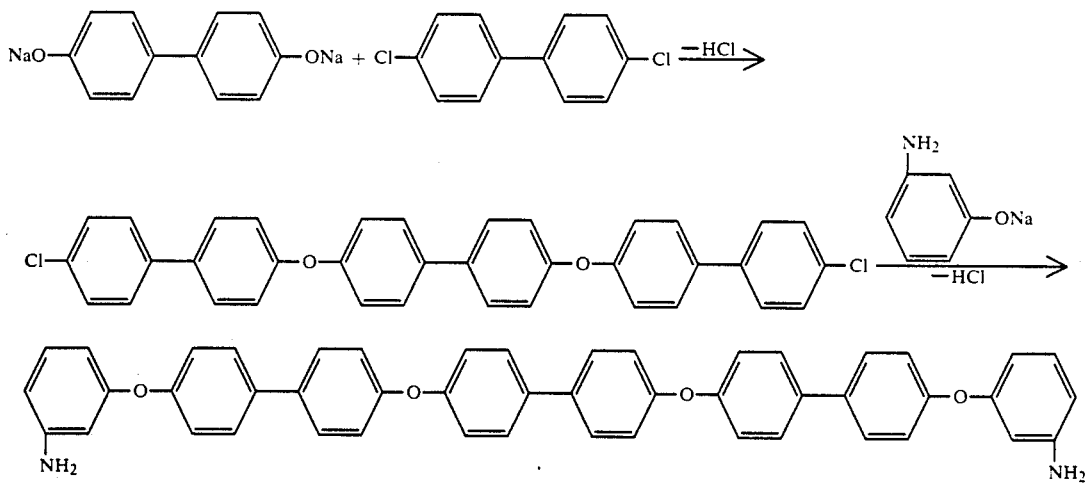

The condensation reaction typically is conducted in a polar organic solvent, such as tetramethylurea; dimethylsulfoxide; 1-methyl-2-pyrrolidone; pyridine; dimethylsulfone; hexamethylphosphoramide; N,N-dimethylformamide; N,N-dimethylacetamide; tetramethylenesulfone; dimethyltetramethylenesulfone; nitrobenzene; tetrahydrofuran; acetone; and the like.

Nonpolar solvents such as benzene, toluene or mesitylene can be employed in admixture with the polar solvents, particularly for the purpose of entraining and removing water as an azeotrope from the condensation reaction medium.

The condensation reaction is conducted at a temperature between about 60°-180° C. for a period between about 0.2-2 hours, until the condensation reaction is completed.

The prepolymer product solution can be employed directly for coating applications or for prepregs in the preparation of laminates.

PRODUCTION OF THERMOSET PRODUCTS

A thermoset medium which exhibits excellent thermo-oxidation properties can be prepared without a catalyst or coreactive agent by heat-treatment of a present invention polyimide prepolymer.

If a prepolymer is in solution, the solution is utilized to form a coating, prepreg, or the like, and the solvent is removed prior to the final curing cycle.

The shaped or molded prepolymer then is cured by heating at a temperature between about 150°-350° C. for a period between about 0.5-3 hours. The prepolymer cures rapidly to a thermoset medium, and the medium is capable of withstanding severe chemical and oxidative environments.

Adhesive Applications

A present invention prepolymer can be used to form excellent high temperature adhesive compositions.

A prepolymer can be applied to different adherend surfaces by coating the surfaces with the prepolymer in the form of a melt, slurry or varnish, and subsequently heat and pressure are applied to form an infusible molecular bond between the adherends. A temperature between about 175°-300° C. and a pressure between about 200-1000 PSI are employed to achieve the desired thermally stable bonding of substrates.

Formation Of Laminates And Composites

High strength laminates and fiber reinforced composites can be prepared with prepolymers of the present invention.

Typically a prepolymer solution or dispersion is applied to a fibrous matting, such as metal, glass, boron or carbon fibers. The impregnated material is dried to remove substantially all of the solvent, and the shaped fiber material subsequently is cured at a temperature between about 200°-275° C., with applied pressure as appropriate.

Preparation Of Molding Powders

In one method a particulate filler is slurried into a solution of a prepolymer, and the solvent is removed by evaporation under reduced pressure. The resultant cake of solids is reduced to a powder by milling or grinding. The prepolymer powder can be employed to form molded products, or it can be used in a fluid-bed system to contact a hot surface with the prepolymer powder, so that the particles melt and flow and coat the hot surface with an adherent film. In a subsequent operation, the coated surface can be heated at a temperature between about 200°-350° C. to cure the prepolymer coating to a thermoset film.

For some applications it is desirable to incorporate between about 10-60 weight percent of reinforcing filler in the prepolymer molding powder. Suitable fillers include silica or other metal oxides, carbon, graphite, glass fibers, clays, and the like.

The following examples are further illustrative of the present invention. The components and specific ingredients are presented as being typical, and various modifications can be derived in view of the foregoing disclosure within the scope of the invention.

EXAMPLE 1

Preparation of
2,2-bis[p,p'-(m-aminophenoxy)phenylsulfonyl(p-phenyleneoxy)phenyl]propane

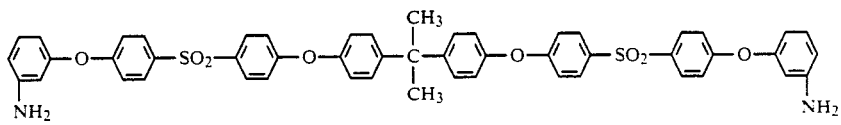

A 5 liter three-necked flask equipped with a Dean-Stark water separator, condenser, nitrogen inlet and outlet, thermometer and mechanical stirrer is charged with 273.93 grams (1.2 moles) of bisphenol A, 192 grams (2.4 moles) of 50% aqueous sodium hydroxide and 2.5 liters of toluene. The reaction mixture is heated at 100°-140° C. for three hours to remove all of the water by a toluene-water azeotrope, and then to remove an additional 1.7 liters of toluene. The resulting mixture is cooled to 60° C., and to the mixture is added 4.5 liters of methyl sulfoxide and 689.2 grams (2.4 moles) of chlorophenylsulfone. The mixture is heated to 130° C., and the reaction temperature then rises to about 150°-160° C., and is maintained at 150° C. for three hours, and then is cooled to room temperature.

Another three-necked flask equipped with a Dean-Stark water separator, condenser, nitrogen inlet and outlet, thermometer and a mechanical stirrer is charged with 261.91 grams (2.4 moles) of meta-aminophenol, 192 grams (2.4 moles) of 50% aqueous sodium hydroxide and 720 milliliters of toluene. The mixture is heated at 100°-140° C. for three hours to remove all of the water and toluene and provide sodium meta-aminophenolate.

The sodium meta-aminophenolate is added to the first reaction flask contents The resulting reaction mixture is heated at 150° C. for three hours, and then poured into 8 liters of water containing 80 grams of sodium sulfite and 320 grams of 50% aqueous sodium hydroxide. The precipitate product is filtered, washed with water and dried at 70° in a forced air oven to provide 1023 grams (97.5% yield) of crude product. The product is dissolved in 10 liters of hot toluene, and the hot toluene solution is decanted and cooled to room temperature. After the decantation of the toluene layer, the residual solid is washed with hexane, treated three times with boiling methanol, and dried to yield a diamine product.

The diamine product has a titrated amine equivalent of 467 (theory 437); m.p. 125°-130° C. [PNMR (DMSO-d6) 7.93 (d, 8H), 7.29 (d, 4H), 7.12 (m, 14H), 6.4 (m, 2H), 6.25 (m, 4H), 5.35 (s, 4H, NH$_2$), 1.68 [s, 6H, C(CH$_3$)].

Preparation of a condensation prepolymer product of maleic anhydride and 2,2-bis[p,p'-(m-aminophenoxy)phenylsulfonyl)-(p-phenyleneoxy)phenyl]propane

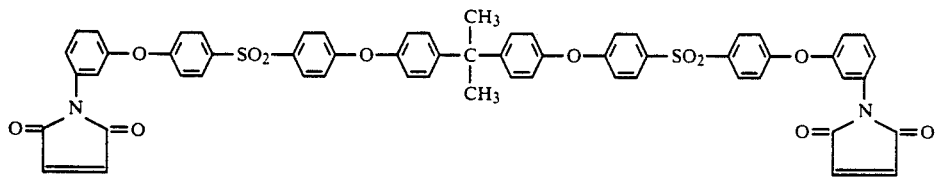

Maleic anhdride (2.3 moles) and the diamine (1.0 mole) are reacted in acetone at 40° C. for one hour. To the reaction mixture are added acetic anhydride (5.4 moles) and triethylamine (0.5 mole). The resulting reaction mixture is reacted at 40° C. for one hour and then stirred for additional 16 hours at ambient temperature. The reaction mixture is poured into water to precipitate the product. The crude product is filtered, and then dissolved in chloroform and washed with 5% sodium bicarbonate solution. The solvent is evaporated to provide the condensation prepolymer product which is dried at 100° C. under a vacuum. The product melts at 85° C., and self-polymerizes starting at 169° C. and ending at 320° C. with delta H of 117.5 j/g.

The prepolymer product solution is coated on a steel plate, and the plate is heated at 180° C. to remove the so]vent medium. The plate then is heated at Z50° for 30 minutes to form a thermoset coating which exhibits long term thermal stability.

Polymerization bonding between two steel plates is accomplished by contacting the surfaces of two steel plates which are coated with the prepolymer, and then heating the structure at 250° C. for 30 minutes under a pressure of about 100 PSI.

A molding powder is prepared by adding about 30% by weight of colloidal silica, based on the total weight of solids, to a solution of the prepolymer. The solvent is removed under vacuum to provide a residual cake of solids. The cake is reduced to a powder by milling. The powder is sieved to remove particles larger than 100 mesh in size. The molding powder is molded by a conventional procedure to form a shaped thermoset structure. Similar results as described above are obtained if the prepolymer is prepared with 2,3-dimethylmaleic anhydride, 2,3-dichloromaleic anhydride, itaconic anhydride or nadic anhydride instead of maleic anhydride.

A modified thermoset structure is obtained if the prepolymer is admixed with up to about an equimolar quantity of the above described diamine before the polymerization reaction phase. Similar results are obtained if a different polyamine is employed, such as hexamethylenediamine.

EXAMPLE 2

Preparation of 2,2-bis[p,p'-(m-aminophenoxy)-phenylsulfonyl(p-phenyleneoxy)phenyl]propane oligomer

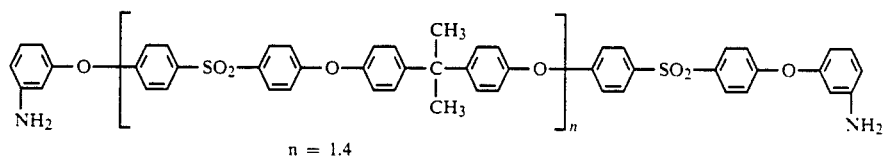

n = 1.4

Using equipment and procedures similar to those illustrated in Example 1, 273.93 grams (1.2 moles) of bisphenol A, 261.91 grams (2.4 moles) of 3-aminophenol, 384 grams (4.8 moles) of 50% aqueous sodium hydroxide, one liter of methyl sulfoxide and one liter of toluene are charged to a reactor. The mixture is heated at 100°-140° C. for three hours and the water of reaction is removed as an azeotrope. The toluene is removed by distillation and the resulting mixture is cooled to 60° C.

To the mixture is added 1.25 liters of methyl sulfoxide and 689.2 grams (2.4 moles) of chlorophenylsulfone. The mixture is heated and maintained at a temperature of 150° C. for three hours. The product mixture is cooled and poured into 8 liters of water containing 80 grams of sodium sulfite and 320 grams of 50% aqueous sodium hydroxide. The precipitate product is filtered, washed with water, and dried at 70° C. to provide 1023 grams (97.5% yield) of crude product.

The product is dissolved in 10 liters of hot toluene, and the hot toluene solution is decanted and cooled to room temperature. After solid formation, the cooled toluene solution is decanted again, and the solid residual product is washed with hexane, and treated three times with boiling methonol to yield the diamine product.

Condensation polyimide prepolymer and shaped thermoset products are prepared in accordance with the procedures illustrated in Example 1.

EXAMPLE 3

Preparation of bis[p,p'-(m-aminophenoxy)phenylsulfonyl-(p-phenyleneoxy)phenyl]thioether

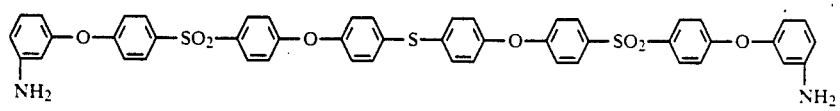

The aromatic diamine compound is prepared in accordance with the procedure of Example 1, except that 4,4'-thiodiphenol (261.92 grams, 1.2 moles) is used instead of bisphenol A.

Condensation polyimide prepolymers and shaped thermoset products are prepared in accordance with the procedures illustrated in Example 1.

EXAMPLE 4

Preparation of
2,2-bis[p,p'-(m-aminophenoxy)-phenylsulfonyl(p-phenyleneoxy)phenyl]-1,1,1,3,3,3-hexafluoropropane

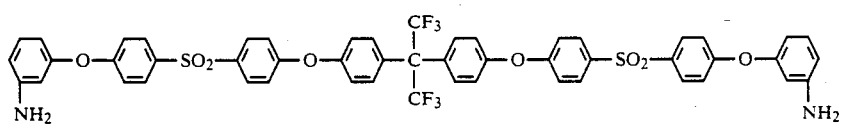

The aromatic diamine compound is prepared by the procedure of Example 1, except that 4,4'(hexafluoroisopropylidene)diphenol (403.49 grams, 1 2 moles) is used instead of bisphenol A.

The diamine product has a titrated amine equivalent of 534 (theory 491); m.p. 86°–90° C.; mass spec [M+1] 983; ir (cm$^{-1}$) 3468, 3384, 1583, 1488, 1294, 1246, 1174, 1152, 1107; [PNMR (DMSO-d6) 7.95 (m, 8H), 7.45 (d, 4H), 7.0–7.3 (m, 14H), 6.45 (m, 2H), 6.25 (m, 4H), 5.34 (s, 4H)].

Condensation polyimide prepolymers and shaped thermoset products are prepared in accordance with the procedures illustrated in Example 1.

The condensation polyimide prepolymer with maleic anhydride has m.p. 105°–107° C.; [PNMR (CDCl$_3$), 7.9 (m, 8H), 7.6–7.0 (m, 24H), 6.85 (s, 4H), and undergoes a self-polymerization commencing at about 155° C. and ending at 350° C., with delta H=78 j/g. The self-polymerized product has a glass transition of 247° C.

A modified thermoset structure is obtained if the prepolymer is admixed with up to about an equimolar quantity of a polyamine before the polymerization reaction phase.

EXAMPLE 5

Preparation of
2,2-bis[p,p'-(m-aminophenoxy)-phenylsulfonyl(p-phenyleneoxy)phenyl]-1,1,1-trifluoropropane

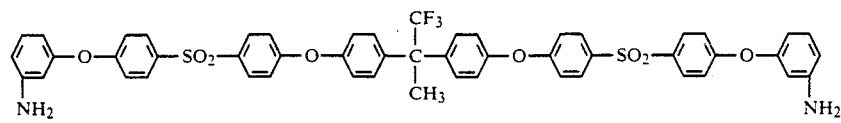

The aromatic diamine compound is prepared in accordance with the procedure of Example 1, except that 4,4'-(trifluoroisopropylidene)diphenol (338.68 grams, 1.2 moles) is used instead of bisphenol A.

Condensation polyimide prepolymers and shaped thermoset products are prepared in accordance with the procedures illustrated in Example 1.

EXAMPLE 6

Preparation of
2,2-bis[p,p'-(m-aminophenoxy)-phenylsulfonyl(p-phenyleneoxy)phenyl]-1,1,1-trifluoro-2-phenylethane

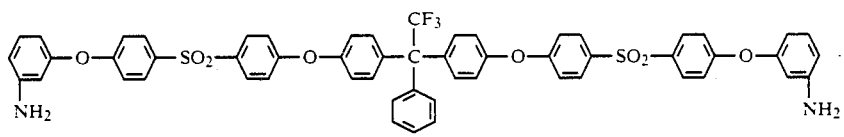

The aromatic diamine compound is prepared in accordance with the procedure of Example 1, except that 4,4'-(1,1,1-trifluoro-2-phenylethyl)diphenol (413.09 grams, 1.2 moles) is used instead of bisphenol A.

Condensation polyimide prepolymers and shaped thermoset products are prepared in accordance with the procedures illustrated in Example 1.

EXAMPLE 7

Preparation of
2,2-bis[p,p'-(m-aminophenoxy)-phenylsulfonyl(p-phenyleneoxy)phenyl]ether

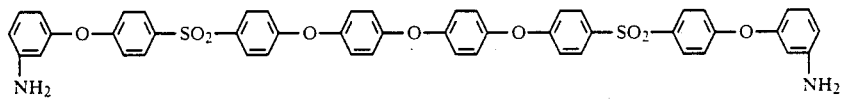

The aromatic diamine compound is prepared in accordance with the procedure of Example 1, except that 4,4'-oxydiphenol (242.75 grams, 1.2 moles) is used instead of bisphenol A.

Condensation polyimide prepolymers and shaped thermoset products are prepared in accordance with the procedures illustrated in Example 1.

EXAMPLE 8

Preparation of bis[p,p'-(m-aminophenoxy)-phenylsulfonyl(p-phenyleneoxy)phenyl]methane

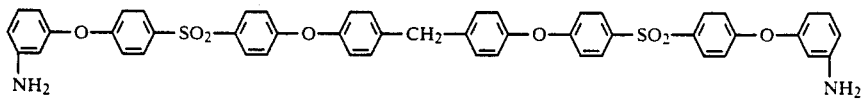

The aromatic diamine compound is prepared in accordance with the procedure of Example 1, except that 4,4'-methylenediphenol (240.35 9rams, 1.2 moles) is used instead of bisphenol A.

Condensation polyimide prepolymers and shaped thermoset products are prepared in accordance with the procedures illustrated in Example 1.

EXAMPLE 9

Preparation of 4,4'-bis[p,p'-(m-aminophenoxy)-phenylsulfonyl(p-phenyleneoxy)]benzophenone

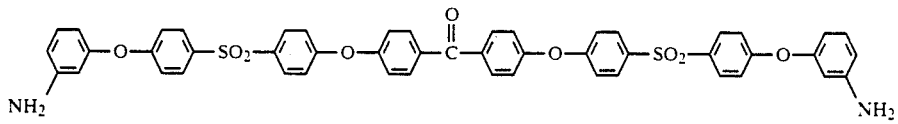

The aromatic diamine compound is prepared in accordance with the procedure of Example 1, except that 4,4'-dihydroxybenzophenone (257.15 grams, 1.2 moles) is used instead of bisphenol A.

Condensation polyimide prepolymers and shaped thermoset products are prepared in accordance with the procedures illustrated in Example 1.

EXAMPLE 10

Preparation of 4,4'-bis[p,p'-(m-aminophenoxy)-phenylsulfonyl(p-phenyleneoxy)]diphenylsulfone

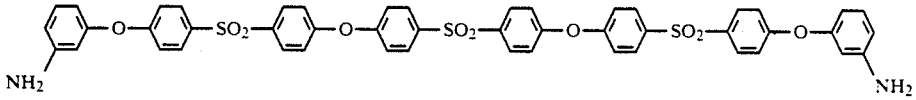

The aromatic diamine compound is prepared in accordance with the procedure of Example 1, except that 4,4'-dihydroxydiphenylsulfone (300.32 grams, 1.2 moles) is used instead of bisphenol A.

Condensation polyimide prepolymers and shaped thermoset products are prepared in accordance with the procedures illustrated in Example 1.

EXAMPLE 11

Preparation of 4,4'-bis[p,p'-(m-aminophenoxy)-phenylsulfonyl(p-phenyleneoxy)]biphenyl

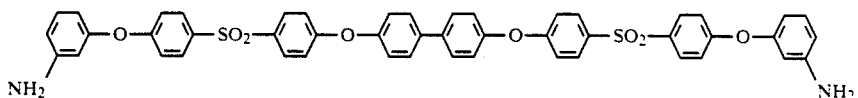

The aromatic diamine compound is prepared in accordance with the procedure of Example 1, except that 4,4'-dihydroxybiphenyl (223.55 grams, 1.2 moles) is used instead of bisphenol A, and that 0.875 liter of methylsulfoxide is added at the beginning of the reaction. The work-up procedure is modified in the following manner. The crude product is treated with one liter of hot hexane to solidify the product. The crude product is soluble in acetone and/or methylene chloride, but insoluble in hot toluene or ethyl acetate. The crude product is dissolved in methylene chloride and washed with water. The methylene chloride layer is collected and evaporated to provide a product, which is dried at 100° C. under a vacuum.

The diamine product has a titrated amine eguivalent of 468 (theory 416); m.p. 101°–105° C.; [PNMR (CDCl$_3$), 7.85 (m, 8H), 7.58 (d, 4H), 7.1 (m, 14H), 6.51 (m, 2H), 6.4 (m, 2H), 6.34 (m, 2H) 3.8 (s, 4H)].

Condensation polyimide prepolymers and shaped thermoset products are prepared in accordance with the procedures illustrated in Example 1.

The condensation polyimide prepolymer with maleic anhydride has m.p. 105°–110° C.; [PNMR (CDCl$_3$) 7.9 (m, 8H), 7.52 (m, 4H), 7.0–7.2 (m, 20H), 6.86 (s, 4H)], and polymerizes at about 250° C.

A modified thermoset structure is obtained if the prepolymer is admixed with up to about an equimolar quantity of a polyamine before the polymerization reaction phase.

EXAMPLE 12

Preparation of
2,2-bis[p,p'-(m-aminophenoxy)-phenylcarbonyl(p-phenyleneoxy)phenyl]propane

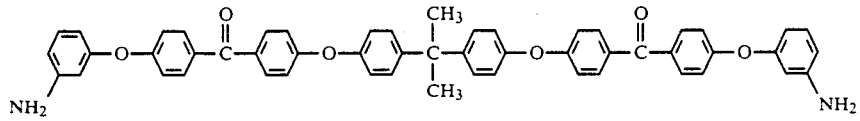

The aromatic diamine compound is prepared in accordance with the procedure of Example 1, except that 4,4'-difluorobenzophenone (523.38 grams, 2.4 moles) is used instead of chlorophenylsulfone.

Condensation polyimide prepolymers and shaped thermoset products are prepared in accordance with the procedures illustrated in Example 1.

EXAMPLE 13

Preparation of
2,2-bis[p,p'-(m-aminophenoxy)-phenylcarbonyl(p-phenyleneoxy)phenyl]thioether

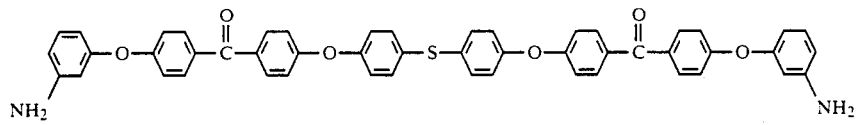

The aromatic diamine compound is prepared in accordance with the procedure of Example 3, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 14

Preparation of
2,2-bis[p,p'-(m-aminophenoxy)-phenylcarbonyl(p-phenyleneoxy)phenyl]-1,1,1,3,3,3hexafluoropropane

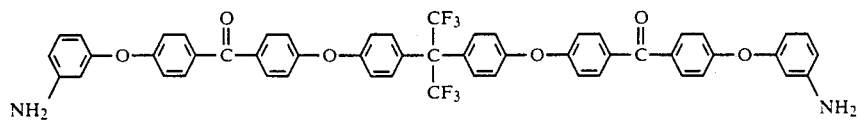

The aromatic diamine compound is prepared in accordance with the procedure of Example 4, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 15

Preparation of
2,2-bis[p,p'-(m-aminophenoxy)-phenylcarbonyl(p-phenyleneoxy)phenyl]-1,1,1-trifluoropropane

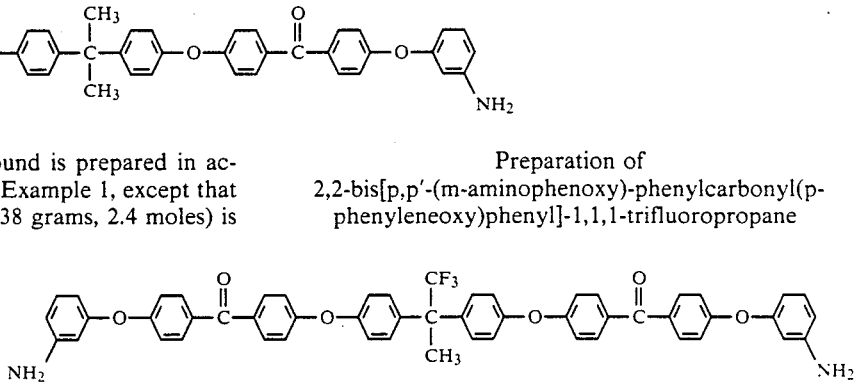

The aromatic diamine compound is prepared in accordance with the procedure of Example 5, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 16

Preparation of
2,2-bis[p,p'-(m-aminophenoxy)-phenylcarbonyl(p-phenyleneoxy)phenyl]-1,1,1-trifluoro-2-phenylethane

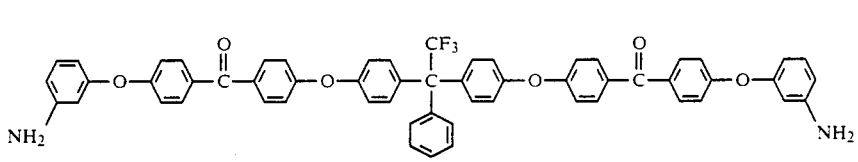

The aromatic diamine compound is prepared in accordance with the procedure of Example 6, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 17

Preparation of 2,2-bis[p,p'-(m-aminophenoxy)-phenylcarbonyl(p-phenyleneoxy)phenyl]ether

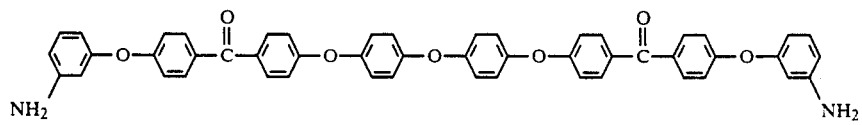

The aromatic diamine compound is prepared in accordance with the procedure of Example 7, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 18

Preparation of bis[p,p'-(m-aminophenoxy)-phenylcarbonyl(p-phenyleneoxy)phenyl]methane

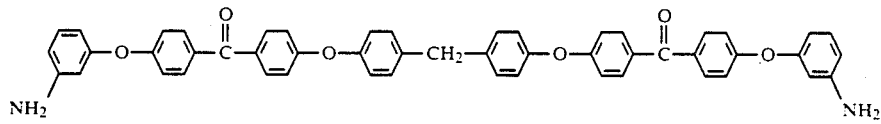

The aromatic diamine compound is prepared in accordance with the procedure of Example 8, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 19

Preparation of 4,4'-bis[p,p'-(m-aminophenoxy)-phenylcarbonyl(p-phenyleneoxy)]benzophenone

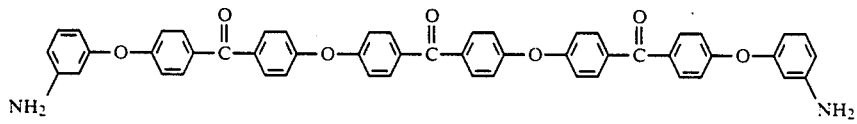

The aromatic diamine compound is prepared in accordance with the procedure of Example 9, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 20

Preparation of 4,4'-bis[p,p'-(m-aminophenoxy)-phenylcarbonyl(p-phenyleneoxy)]diphenylsulfone

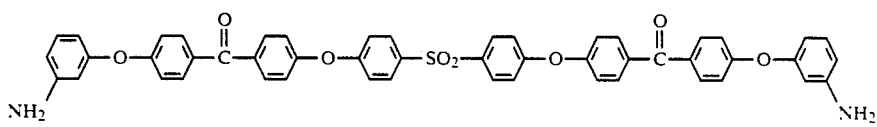

The aromatic diamine compound is prepared in accordance with the procedure of Example 10, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

EXAMPLE 21

Preparation of 4,4'-bis[p,p'-(m-aminophenoxy)-phenylcarbonyl(p-phenyleneoxy)]biphenyl

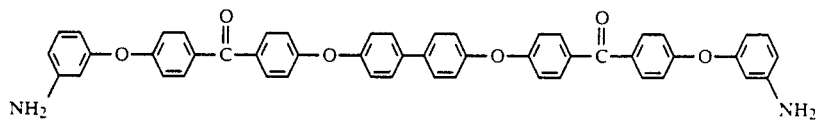

The aromatic diamine compound is prepared in accordance with the procedure of Example 11, except that 4,4'-difluorobenzophenone (523.68 grams, 2.4 moles) is used instead of chlorophenylsulfone.

Condensation polyimide prepolymers and shaped thermoset products are prepared in accordance with the procedures illustrated in Example 1.

What is claimed is:

1. A thermosetting composition comprising (a) a polyamine component; and (b) a prepolymer corresponding to the formula:

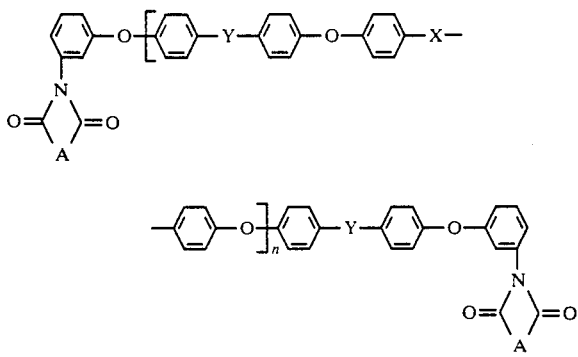

where X is a single bond, or an oxy, thio, carbonyl, sulfonyl radical, or an alkylene, haloalkylene or aralkylene radical containing between about 1-18 carbon atoms; Y is a $C_1$–$C_6$ alkylene, carbonyl or sulfonyl radical; A is a divalent $C_2$–$C_{12}$ organic radical having olefinic unsaturation; and n is a number having an average value between about 1-5.

2. A thermosetting composition comprising
(a) a prepolymer corresponding to the formula:

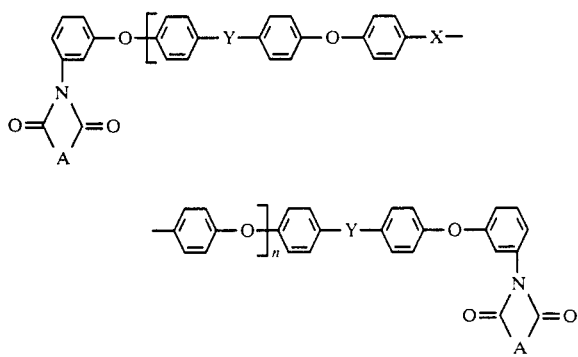

and (b) between about 0.1-1 mole, per mole of prepolymer, of a diamine reactant corresponding to the formula:

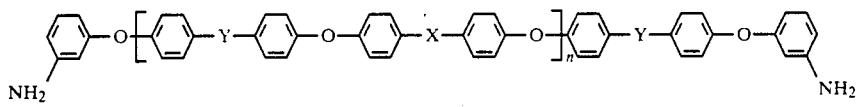

where in the above formulas X is a single bond, or an oxy, thio, carbonyl, sulfonyl radical, or an alkylene, haloalkylene or aralkylene radical containing between about 1-18 carbon atoms; Y is a $C_1$–$C_6$ alkylene, carbonyl or sulfonyl radical; A is a divalent $C_2$–$C_{12}$ organic radical having olefinic unsaturation; and n is a number having an average value between about 1-5.

3. A thermosetting composition in accordance with claim 2 wherein the diamine reactant is a compound selected from the group consisting of 2,2-bis[p,p'-(m-aminophenoxy)phenylsulfonyl(p-phenyleneoxy)-phenyl]propane; 2,2-bis[p,p'-(m-aminophenoxy)phenylsulfonyl(p-phenyleneoxy)phenyl]propane oligomer; 2,2-bis[bis[p,p'-(m-aminophenoxy)phenylsulfonyl(p-phenyleneoxy)phenyl]thioether; 2,2-bis[p,p'-(m-aminophenoxy)phenylsulfonyl(p-phenyleneoxy)phenyl]-1,1,1,3,3,3-hexafluoropropane; 2,2-bis[p,p'-(m-aminophenoxy)phenylsulfonyl(p-phenyleneoxy)phenyl]-1,1,1-trifluoropropane; 2,2-bis[p,p'-(m-aminophenoxy)phenylsulfonyl(p-phenyleneoxy)phenyl]-1,1,1-trifluoro-2-phenylethane; 2,2-bis[p,p'-(m-aminophenoxy)phenylsulfonyl(p-phenyleneoxy)phenyl]ether; bis[p,p'-(maminophenoxy)phenylsulfonyl(p-phenyleneoxy)-phenyl]methane; 4,4'-bis[p,p'-(m-aminophenoxy)phenylsulfonyl(p-phenyleneoxy)πbenzophenone; 4,4'-bis[p,p'-(m-aminophenoxy)phenylsulfonyl(p-phenyleneoxy)]diphenylsulfone; 4,4'-bis[p,p'-(m-aminophenoxy)phenylsulfonyl(p-phenyleneoxy)]biphenyl; 2,2-bis[p,p'-(m-aminophenoxy)phenylcarbonyl(p-phenyleneoxy)phenyl]propane; 2,2-bis[p,p'-(m-aminophenoxy)phenylcarbonyl(p-phenyleneoxy)phenyl]thioether; 2,2-bis[p,p'-(m-aminophenoxy)phenylcarbonyl(p-phenyleneoxy)phenyl]-1,1,1,3,3,3-hexafluoropropane; 2,2-bis[p,p'-(m-aminophenoxy)phenylcarbonyl(p-phenyleneoxy)phenyl]-1,1,1-trifluoropropane; 2,2-bis[bis[p,p'-(m-aminophenoxy)phenylcarbonyl(p-phenyleneoxy)phenyl]-1,1,1-trifluoro-2-phenylethane; 2,2-bis[p,p'-(m-aminophenoxy)phenylcarbonyl(p-phenyleneoxy)phenyl]ether; bis[p,p'-(m-aminophenoxy)-phenylcarbonyl(p-phenyleneoxy)phenyl]methane; 4,4'-bis[p,p'-(m-aminophenoxy)phenylcarbonyl(p-phenyleneoxy)]benzophenone; 4,4'-bis[p,p'-(m-aminophenoxy)phenylcarbonyl(p-phenyleneoxy)]diphenylsulfone; and 4,4'-bis[p,p'-(m-aminophenoxy)phenylcarbonyl(p-phenyleneoxy)]diphenyl.

* * * * *